May 30, 1961  R. K. LE ROUAX  2,986,367
VALVE
Filed Jan. 25, 1957  5 Sheets-Sheet 1
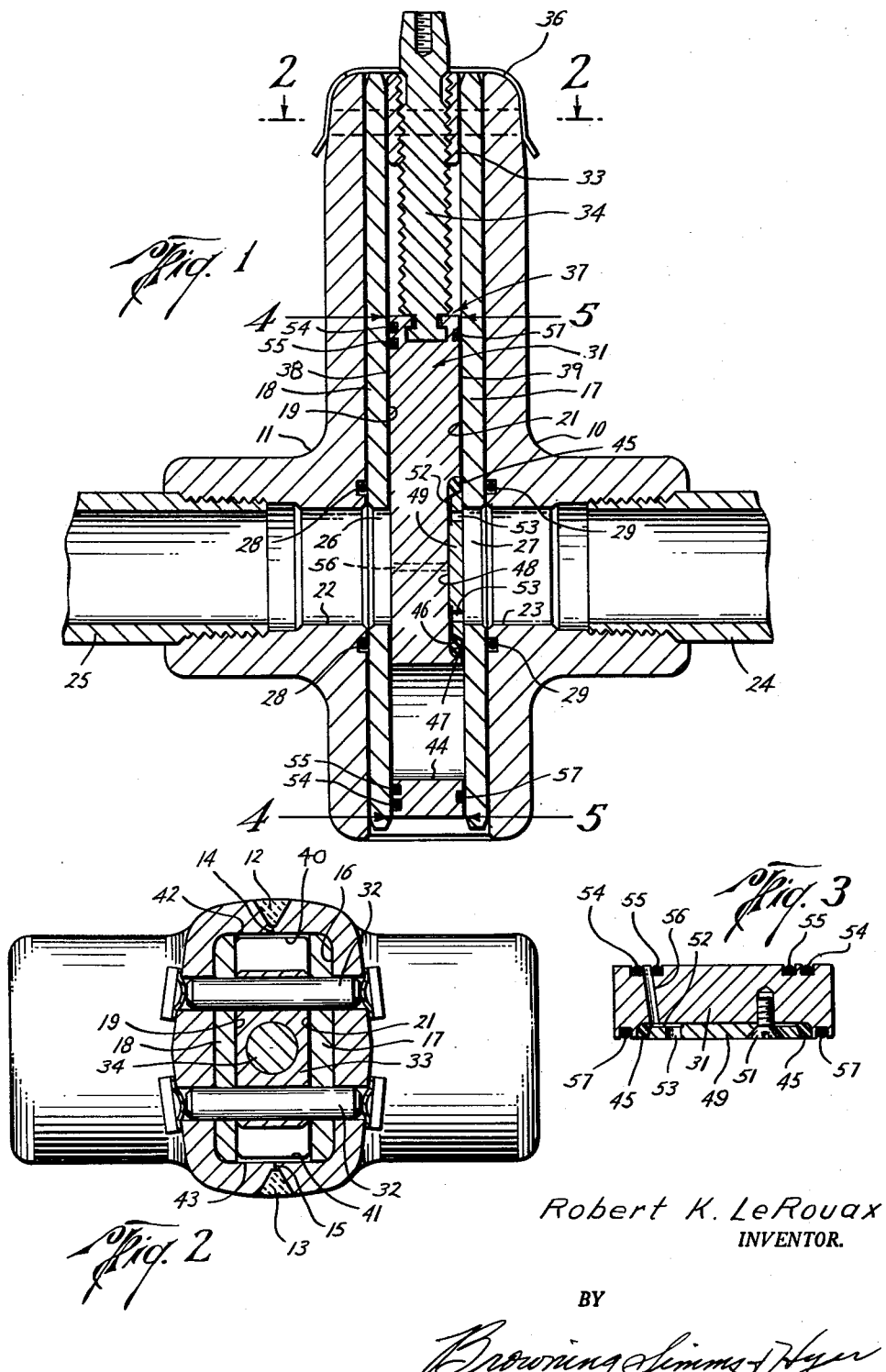
Robert K. LeRouax
INVENTOR.
BY
Browning Simms & Hyer
ATTORNEYS

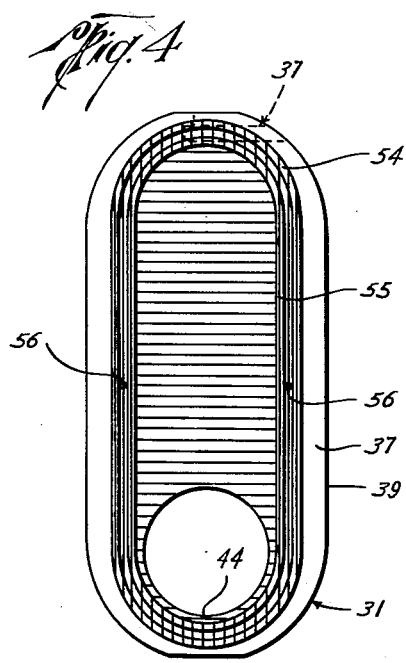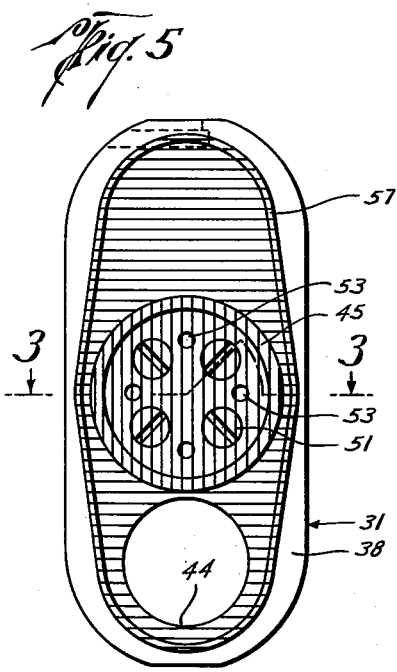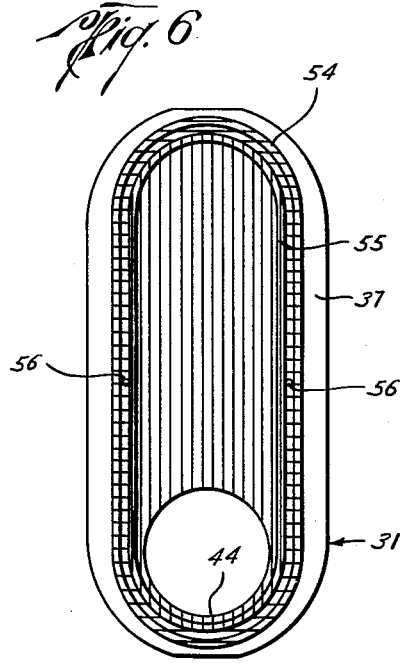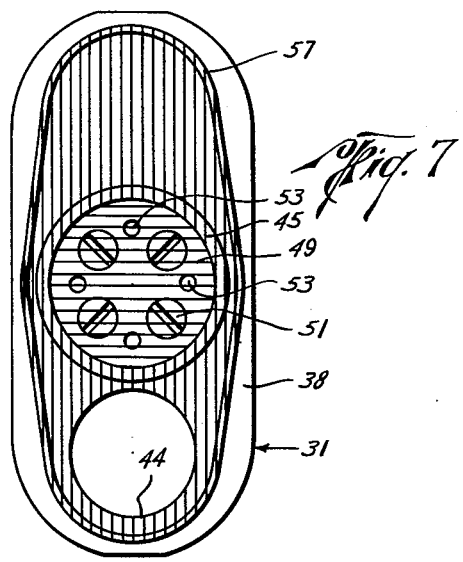

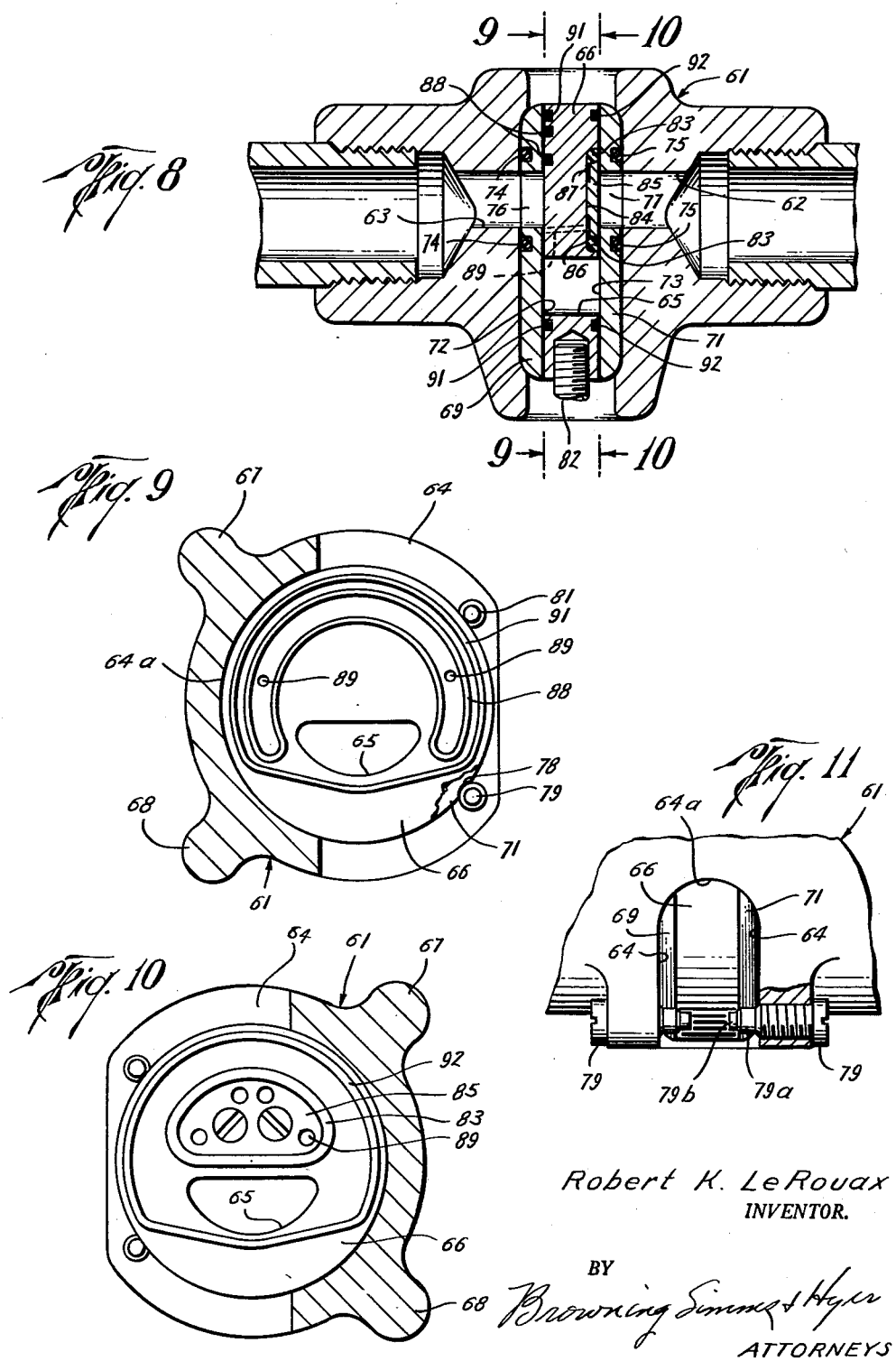

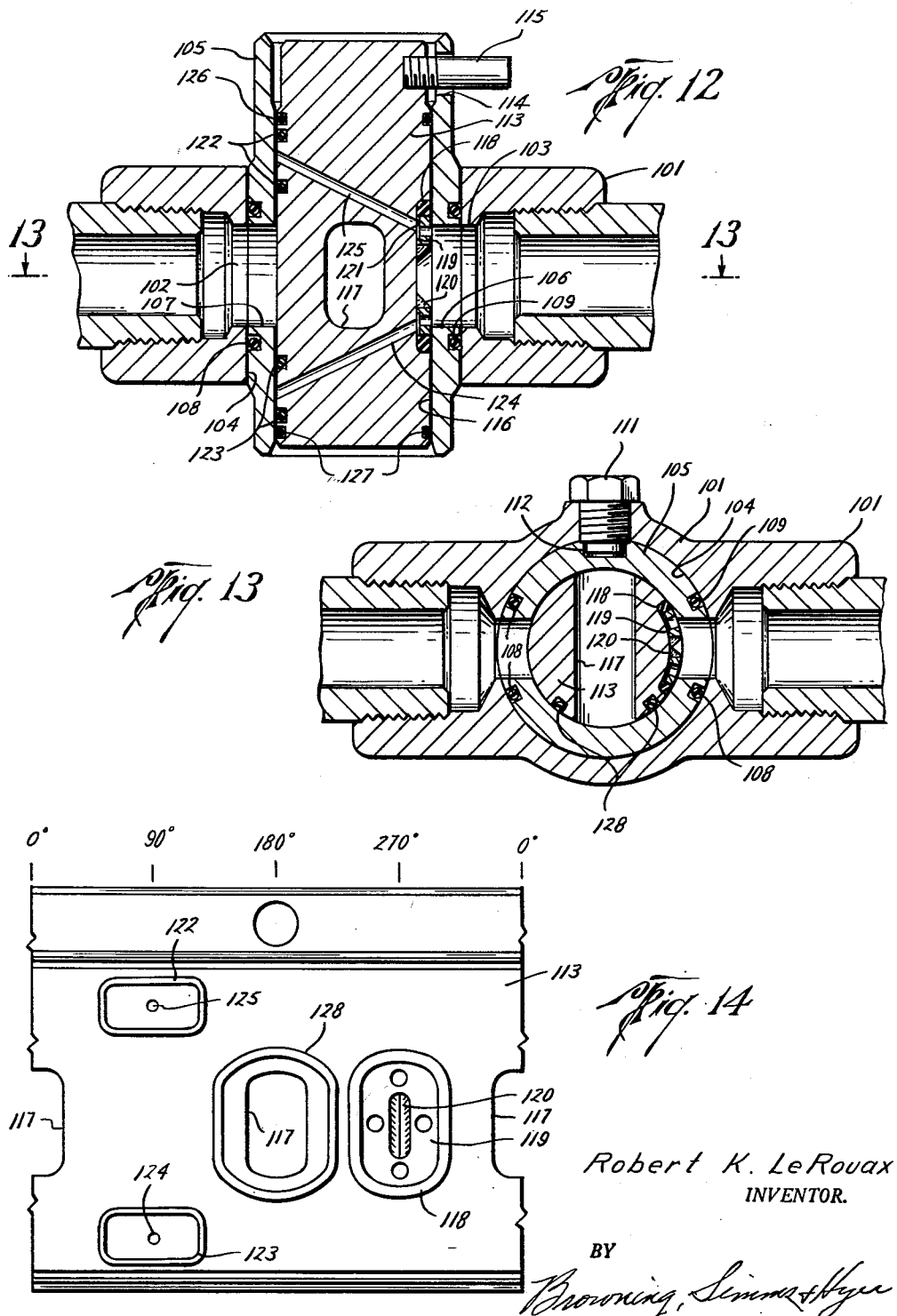

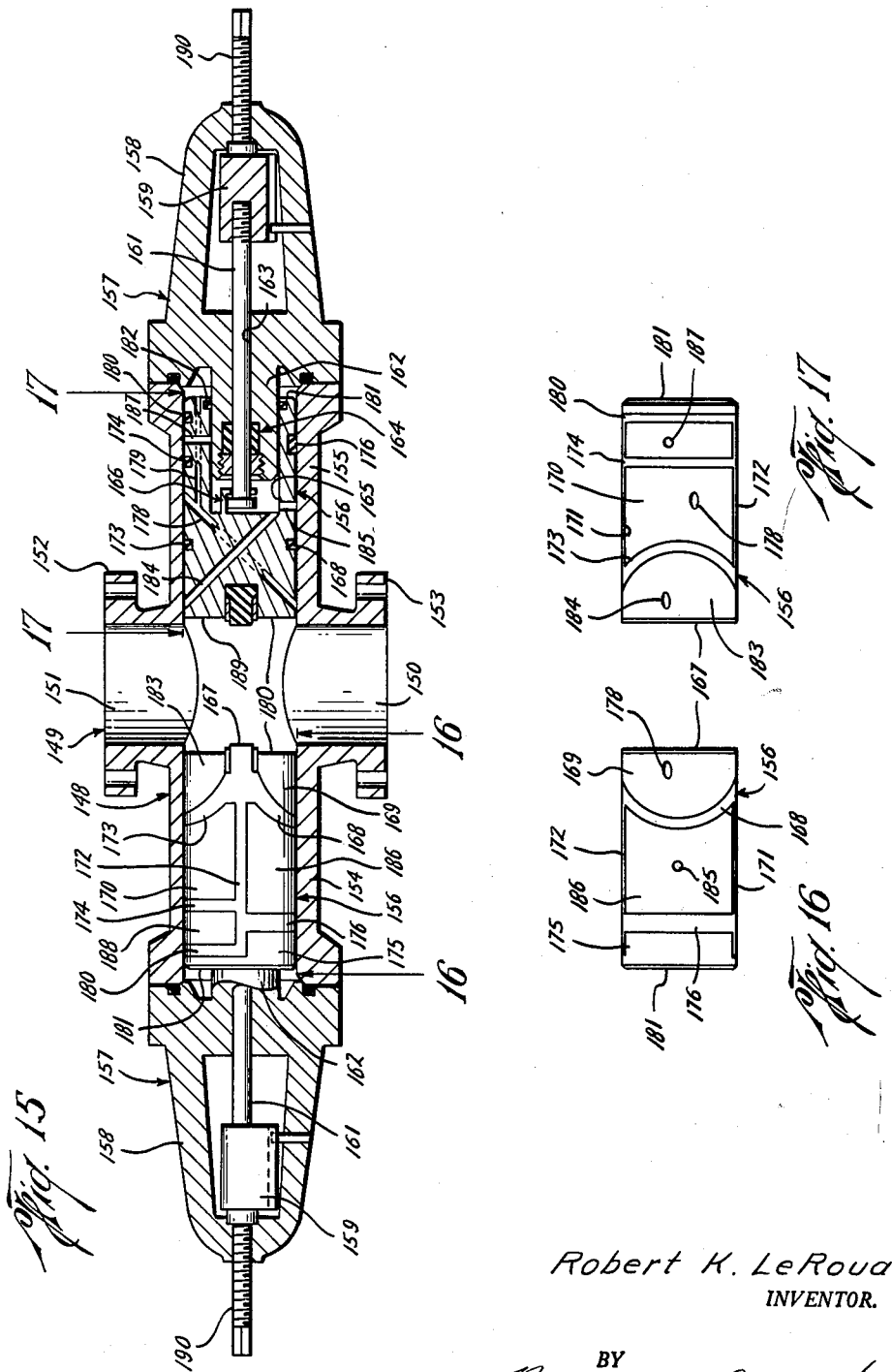

United States Patent Office 2,986,367
Patented May 30, 1961

2,986,367

VALVE

Robert K. Le Rouax, Houston, Tex., assignor to
Cameron Iron Works, Inc., Houston, Tex.

Filed Jan. 25, 1957, Ser. No. 636,287

40 Claims. (Cl. 251—1)

This invention relates to flow control valves and more particularly to valves in which the effect of flow line pressure on the valve member is balanced.

In addition to ordinary types of valves, this invention applies to certain special types such as blowout preventers used to close a well about a pipe therein or when no pipe is therein, to control the well.

In valves such as disc valves, gate valves, plug valves, ram type blowout preventers, etc., in which the differential across the valve when closed exerts a thrust on the valve member, considerable difficulty is experienced in moving the valve member. It will be appreciated that the thrust on the valve member causes considerable friction between the valve member and seat. This friction must be overcome in operation of the valve. This friction contributes to wear of the valve and shortens its life. It has been a limiting factor in designing valves of all types for high pressures and in large sizes. The present invention removes this factor as a limitation on design.

Balancing pistons have been used with considerable success in so-called plunger type valves in which the closure moves axially of the valve to engage and disengage a seat in closing and opening. The plunger type valve, however, is not subject to side thrust as is a blowout preventer, gate, disc, or plug valve. So far as is known there has never been a commercially successful, completely balanced blowout preventer, gate, disc, or plug valve. The reason these types of valves have not been balanced is probably due to the difficulty of balancing the valve member with a simple commercially acceptable structure. In balancing the side thrust on the valve member conditions should not be set up which permit endwise thrust on the valve member. The valve should be completely balanced or unbalanced in a predetermined amount to provide for particular service conditions. On the other hand, the size of the valve must not be unduly increased. Conventional basic design practice should be followed.

In blowout preventers the high pressure will always be on one side of the valve. Preventers are carefully installed and would not be installed upside down. On the other hand, it is undesirable to have a fixed high pressure side on a gate, disc, or plug valve. If either side can be the high pressure side, the valve can be installed quicker. The pressure differential may sometimes be reversed across a valve and it should operate equally well when this happens.

To insure balance over a broad range of pressure the balancing areas should be sharply defined. A flowable seal such as an interference type seal gives a sharply defined area. However, as the differential across the valve changes direction, the areas defined by such seals will change. Such changes of area must be in balance to give a completely balanced valve.

Blowout preventers sometimes employ one ram but usually employ two or more opposed rams. In a multiple ram preventer the rams abut each other and, if present, a pipe in the middle of the passageway controlled. The side thrust, namely the thrust in a direction transverse of the direction of movement of the rams, against the lower surfaces of the rams when closed to contain pressure in a well causes a very high turning moment on each ram. As well pressures have continued to increase, power necessary to overcome the side thrust and operate the rams has increased.

It would be very advantageous to have a blowout preventer in which the rams are completely balanced, or in which a desired unbalance could be designed into the rams. This is particularly true in modern deep wells which develop pressures upward of 10,000 p.s.i.

The rams should not be unduly lengthened in providing for balance. As the area to be balanced is on one end of each ram a turning moment is exerted on the ram. The length of the ram could be held down if in balancing the ram a reverse turning moment could be provided by areas other than those utilized in balancing side thrust.

When a blowout preventer is closed one area of a ram front is exposed to pressure on one side of the preventer. When open an additional area of a ram front is exposed to pressure on this side of the preventer. It would be advantageous to balance these pressures and it would be particularly advantageous to balance the pressures with the rams in either open or closed position.

It is an object of this invention to provide a valve of the type subject to a side thrust on the valve member which is completely balanced.

Another object is to provide a valve of the type discussed above which is generally conventional in design and which is fully balanced.

Another object is to provide a valve which is generally conventional in design and which is fully balanced in open and closed and all intermediate positions.

Another object is to provide a valve of any of the types discussed above, including blowout preventers, in which the valve may be completely balanced, or may be unbalanced by a predetermined amount.

Another object is to provide a completely balanced valve of the type discussed above in which the valve seat whether it be of the form for a ram, for a cylindrical valve member or for a flat valve member such as a disc valve or gate valve, as well as the valve body may be constructed in more or less simple conventional form and all passageways and seals for controlling flow through the valve as well as balancing the effect of both upstream and downstream pressure on the valve member may be carried by the valve member.

Another object is to provide a blowout preventer in which pressure on the ram front is counterbalanced.

Another object is to provide a blowout preventer in which pressure on the ram front is counterbalanced with the rams in either open or closed position.

Another object is to provide a balanced valve in which line pressure on the valve member is completely balanced regardless of which side of the valve is exposed to the higher pressure.

Another object is to provide a completely balanced valve as in the preceding object in which flowable seal members are used to sharply define areas and in which the mutually opposed areas subject to pressure increase and decrease by equal and opposite effective pressure areas when the pressure differential across the valve changes direction.

Another object is to provide a valve of the type referred to above in which a number of seals are used to provide balancing areas and in which only one seal moves past a flow passageway in opening and closing the valve.

Another object is to provide a valve of the type referred to above in which the valve member has a flow passageway therethrough and in which only one of a number of seal members used to provide for balancing of the valve need move past a flow passageway as the valve member moves from open to closed position.

Another object is to provide a fully balanced blowout preventer.

Another object is to provide a blowout preventer in which both side and endwise thrust due to well pressure on the rams is balanced.

Another object is to provide a blowout preventer in which the rams are not unduly legnthened in providing for balance.

Another object is to provide a blowout preventer in which counterbalancing moments are set up on the ram in providing for side thrust and endwise balance to permit reduction of the size of the ram.

Another object is to provide a blowout preventer in which substantially the entire periphery of the ram is usefully employed in controlling flow through the blowout preventer or in balancing the ram.

Other objects, features, and advantages of this invention will appear from time to time as the description of the illustrative embodiments proceeds.

In the drawings wherein there is shown by way of illustration several forms of this invention and wherein like reference numerals indicate like parts:

Fig. 1 is a sectional view through a gate valve illustrative of this invention;

Fig. 2 is a view along the lines 2—2 of Fig. 1;

Fig. 3 is a sectional view taken along the lines 3—3 of Fig. 5;

Figs. 4 and 5 are views taken along the lines 4—4 and 5—5 respectively of Fig. 1 and showing in vertical shading the area of the valve member exposed to pressure in the righthand passageway into the valve and in horizontal shading the areas of the valve member exposed to pressure in the lefthand passageway into the valve when pressure in the righthand passageway is greater than pressure in the lefthand passageway;

Figs. 6 and 7 are similar to Figs. 4 and 5 showing the areas exposed to pressure on opposite sides of the valve member when pressure is greater in the lefthand passageway than in the righthand passageway;

Fig. 8 is a sectional view through a disc valve illustrating this invention;

Fig. 9 is taken along the lines 9—9 of Fig. 8 in the direction of the arrows;

Fig. 10 is taken along the lines 10—10 of Fig. 8 in the direction of the arrows;

Fig. 11 is a fragmentary bird's-eye view of the valve of Fig. 8 with parts broken away;

Fig. 12 is a sectional view through a plug valve constructed in accordance with this invention;

Fig. 13 is a view along the lines 13—13 of Fig. 12;

Fig. 14 is a development of the valve member of the plug valve;

Fig. 15 is a sectional view through a blowout preventer constructed in accordance with this invention with the lefthand ram shown in elevation;

Fig. 16 is a bottom plan view of the rams of Fig. 15 taken along the lines 16—16 of Fig. 15; and Fig. 17 is a top plan view of the rams of Fig. 15 taken along the lines 17—17 of Fig. 15.

In general each of the forms of valves illustrated is balanced by providing opposed balancing areas on the valve member. The centroids of the balancing areas are such that the moments on the valve members are balanced. The construction is such that for each area on the valve member there is provided an area having an equal and opposite effective pressure area. Some of the areas of the valve members are open to atmosphere but could be totally or partially enclosed and subjected to line pressure if desired. The blowout preventer illustrated has counterbalanced moments of force provided by areas for balancing side thrust and end thrust. This permits a shorter ram. It will be understood that the side thrust moments and end thrust moments could be individually balanced if desired.

The gate valve shown in Figs. 1 through 7 is illustrative of the principles of this invention. The valve is provided with a two-piece body which is assembled from identical halves 10 and 11. As best shown in Fig. 2, the two halves 10 and 11 are welded together by welds 12 and 13. The weld groove in the body for welds 12 and 13 does not extend completely through the side wall of the valve leaving inner abutments 14 and 15 to accurately position the halves relative to each other. This construction permits the ready economical formation of the body as by forging, casting, or any economical process with a minimum amount of machining necessary.

The body is provided with confronting seat surfaces for engagement with a valve member. These seat surfaces may be carried by the body or they may be provided by wear plates which are readily replaceable. In the form of valve illustrated, the valve body has a rectangular slot 16 in which there is positioned a pair of wear plates 17 and 18. The confronting surfaces 19 and 21 of these wear plates provide seat surfaces for the valve.

A flow-way through the valve member is provided by passageways 22 and 23 in the valve member. Preferably, these passageways are in line so that the valve when open will offer no obstruction to flow of fluid in the line being controlled. As shown, these passageways are provided with suitable end fittings for making up the valve between conduits 24 and 25. This connection between the valve and conduit may be any conventional form such as the threaded connection shown.

The wear plates 17 and 18 are provided with passageways 26 and 27 which register with the passageways 22 and 23 through the valve body. Passageways 26 and 27 are of a like size and configuration with the passageways 22 and 23 and form in effect a continuation of the inlets of the valve body. O-rings 28 and 29 seal between the valve body and the wear plates and about the flow passageways therethrough.

The seat surfaces 19 and 21 confront and are parallel to each other. They are also plain, flat surfaces preferably fabricated to provide a smooth seal surface for cooperation with valve means 31 which controls flow through the valve. The wear plates are held in position within the valve member by dowel pins 32. The pins extend through the valve body, wear plates 17 and 18, and a nut 33 interposed between the wear plates in the upper section of the valve.

The nut 33 threadedly receives valve stem 34. Upon rotation of the valve stem 34 by a suitable handle, the valve member 31 will be raised and lowered to open and close the valve. The pins 32 are held in place by suitable latch members 36 which overlie both ends of the pins 32 and hold them in position.

The valve stem 34 is connected to the valve member by a conventional T-slot arrangement indicated generally at 37 which permits the valve stem to be engaged with the valve member by relative lateral movement and permits free rotation of the valve stem relative to the valve member.

The valve member is generally rectangular in shape and has opposed parallel flat surfaces 38 and 39 which slidingly engage seat surfaces 19 and 21 at all times. The side surfaces 40 and 41 (Fig. 2) are also parallel and in sliding engagement with walls 42 and 43 of the valve member to confine the valve member to a predetermined reciprocating path.

Preferably, the valve is of the type which has a flow-way 44 extending therethrough which aligns with passageways 22 and 23 in the body when the valve is open. This form permits seal means on the valve member to confine flow through the valve with only one seal being required to cross the flow-way through the valve as the valve member moves between open and closed position.

This will greatly reduce the possibility of trouble with the seals.

Seal means is provided for sealing between the valve member and flow passageways to prevent flow through the valve when closed. The seal means illustrated are provided by interference type seals in grooves whose side walls provide downstream dams for the seals. The seal means defines balancing areas on the valve member and preferably all areas of the valve member are provided with equal and opposite effective pressure areas. It will be understood that the balancing areas may be designed for a predetermined unbalanced condition. For instance, in service where very high velocity fluid is controlled, the kinetic energy of the fluid will cause considerable side thrust on the valve member resisting its movement. The balancing areas may be designed to offset this side thrust.

With the valve member in closed position as shown in Fig. 1, flow through the valve is prevented by an annular seal member 45 between the seat surface 21 and valve member 31. Preferably, this seal is carried by the valve member. In the form of valve shown, this seal is the only seal which passes over the flow-way through the valve and for this reason an undercut surface 46 forms a part of the seal receiving groove 47 to better hold the seal in place and prevent it being pulled out of its groove upon reciprocation of the valve member. For ease in machining this groove the valve member is relieved at 48 and a plate 49 machined with the desired undercut surface 46 is secured in the depression as by screws 51 (Fig. 3). The plate is fabricated with an undercut in the back side of the plate. This provides a passageway 52 which communicates with the underside of the O-ring 45. This passageway communicates with holes 53 extending through the plate so that the passageway is exposed to the same pressure as passageway 23. Assuming the pressure in passageway 23 be lower than the pressure in passageway 22, this passageway 52 will function to resist the tendency of the seal member 45 to be forced out of its groove as it moves across the passageway 23. The passageway 52 being subjected to the low pressure, the high pressure behind the seal member 45 tends to force it into the groove and a force is set up resisting the tendency of the differential in pressure across the valve member to pull the seal member 45 out into the passageway 23 when the valve is reciprocated. When the pressure is highest in passageway 23, this problem is not present. The seal is held in its groove by seat surface 21.

The seal 45 defines an area subject to pressure within passageway 23. Assuming this pressure to be higher than pressure in passageway 22, it exerts a thrust on the valve member tending to force it into contact with seat surface 19. This thrust results in a large frictional load in reciprocating the valve member unless it is balanced. In order that this pressure be balanced, there is provided on the other side of the valve member seal means which define an area having an equal and opposite effective pressure area to the area defined by seal 45. This seal means may be provided by a pair of outer and inner O-ring type seal members 54 and 55 respectively in the usual seal receiving grooves. In order that there be no turning moment on the valve member due to this balancing area, it is designed to have its centroid on a line perpendicular to the seat surfaces and passing through the centroid of the area defined by seal 45. Inasmuch as the two seat surfaces 19 and 21 are flat parallel surfaces, the area defined by seal means 54 and 55 is equal to the area defined by seal means 45.

To provide fluid communication between the two areas referred to above passageways 56 are provided through the valve member and communicate with the areas defined respectively by seal 45 and by seals 54 and 55 on opposite sides of the valve member as best shown in Fig. 3.

At this point, it might be pointed out that the pressure in passageway 22 is exerted on the valve member over an area defined by the innermost seal 55. This pressure exerts a thrust on the valve member tending to force it against seat 21 resulting in frictional resistance to shifting of the valve member. This force is preferably balanced and for this purpose a seal 57 is provided sealing between the valve member and seat surface 21. The seal 57 combines with seal 45 to define an area equal to the area defined by the seal 55 on the opposite side of the valve member.

In order to expose the area defined by seals 57 and 45 to pressure within passageway 22, a passageway must be provided. Where a valve member having a thruway such as 44 is used, this thruway will provide the means for interconnecting the areas on opposite sides of the valve member which are to be exposed to pressure within passageway 22.

It will be noted that seals 54, 55 and 57 are preferably rings surrounding the passageway through the valve seats and valve member when the valve member is in either open or closed position. The only seal which need pass over the passageway through the body in reciprocating of the valve member is ring seal 45. This adds to the life of the valve by reducing the possibility of leakage past the seals.

It is preferred that the seal means for defining the balancing areas be provided by seals which exert a minimum of resistance to movement of the valve member such as interference type seals. It is further preferred that the seals be of flowable material such as O-rings or other interference type seals, plastic packing, grease or the like to give sharp lines of division between the pressure areas.

In a flowable seal member as shown in Fig. 1, the walls of the groove form a support against downstream displacement of the seal member by pressure. We can refer to such a support as a "dam." Such dams may also be provided by retainer rings or other means familiar to those skilled in the art.

"Seal means," as used herein, refers to a flowable seal member and the groove which contains it.

The downstream dam forms substantially the line of pressure demarcation and thus the boundary of the area defined by the seal means. The location of the downstream dam changes from one side of the seal means to the other as the higher pressure shifts across the seal. This then results in a change of the sealed area fixed by the location of the dams.

When the seal means define balancing areas on opposite sides of a closing member, they need to provide the same amount of change in area when the high pressure shifts from one end of the valve to the other. Making the areas between alternate downstream dams on the respective sealing means equal insures that the changes in area equal each other.

In the specification and claims, the phrase "area of the seal means in the plane of contact between the valve member and seal provide equal and opposite effective pressure areas" and phrases of like connotation mean the area of the seal means to which higher pressure applies regardless of which side of the valve is exposed to higher pressure. For example, the area at the mouth of the groove containing seal member 45 forms the area of one seal means. This area is equal to the area at the mouth of the groove containing seal member 55. The side walls of the grooves containing seals 45 and 55 define the area to which the higher pressure always applies.

Figs. 4 through 7 illustrate the shifting of areas referred to above. In Figs. 4 and 5, the high pressure is in passageway 23 and low pressure in passageway 22. Thus, high pressure (vertical shading) is effective on the area defined by the seal means including seal ring 45. Pressure fluid passing through passageways 56 to the other side of the valve member will be exerted over an area including both seal means including seal elements 54 and 55, which are O-rings, and the area therebetween. Thus, the arrangement of seals should be such that with the high pressure in passageway 23, the area defined by the outer wall of the groove containing seal 45 is equal to the area defined by the inner wall of the groove containing seal 55 and the outer wall of the groove containing seal 54. The low pressure within passageway 22, horizontal shading, will be exerted against the valve member over an area defined by the inner wall of the groove containing seal 55 and the outer wall of the grooves containing seals 45 and 57. The centroids of both low pressure areas fall on a line which is perpendicular to the seat surfaces so that the pressure on the valve member will be balanced and there will be no turning moment on the valve member. Likewise, the areas exposed to high pressure have centroids which lie on a common line perpendicular to the seat surfaces.

Now considering Figs. 6 and 7 in which the high pressure is in passageway 22 and the low pressure is in passageway 23, it will be seen that the high pressure from passageway 22 is now effective over the area of both seal means containing seal rings 45 and 55. In this instance, the low pressure begins at the outer wall of the groove containing the inner O-ring 55 and includes the area of the groove containing O-ring 54 on one side of the valve. On the other side of the valve it is defined by the inner wall of the groove containing seal 45.

From the above, it will be seen that as the pressure differential changes across the valve member, substantially the area of the grooves containing seals 45 and 55 is added to the area exposed to the new high side of the valve and subtracted from the area exposed to the new low side of the valve. This is true regardless of which side of the valve is exposed to the higher pressure. Thus, by providing seal members of flowable character and designing these two seal means so that their area in the plane of contact between the valve member and seat surface is equal, the balancing areas on the valve member will be maintained equal regardless of which side of the valve is exposed to high pressure. The very considerable advantage of this structure lies not only in the fact that the valve can cope with a reversal of pressure, but in the fact that the valve may be installed in the line without reference to which is the normal high pressure side.

It is further pointed out that the area of the valve member outside of the grooves containing rings 54 and 57 provides equal and opposite effective pressure areas on the valve member. Thus, if this area were subjected to line pressure, it would not unbalance the valve member. Therefore, the valve could be enclosed instead of having an open top and bottom as illustrated. Considered in terms of absolute pressures the area of the valve member outside the grooves containing O-rings 54 and 57 is subjected to atmospheric pressure. As this area is in balance, this pressure does not effect the valve member.

Inasmuch as interference types of seals such as O-rings do not require repressurizing after each opening and closing of the valve, they are preferred over other types of seals to define the several balancing areas on the valve member.

Referring to Figs. 8 through 11, there is shown a disc type valve which is balanced in the same fashion as the gate valve of Fig. 1. The disc valve has a one-piece body 61. The body has passageways 62 and 63 which are preferably in-line and open into a slot 64 extending transversely of the body and little more than half way through the body as best shown in Figs. 9 and 10. The inlets 62 and 63 may terminate in any form of coupling such as the threaded coupling shown. The particular valve illustrated is designed for use under high pressure service with heavy duty pipe. Therefore, the passageways 62 and 63, while appearing to be smaller than the threaded connectors of the body, have an effective cross sectional flow area substantially equal to the internal diameter of the pipes with which the valve is to be used. The flow-ways 62 and 63 conform to the half moon shaped opening 65 in the valve member 66.

Due to the slot 64, pressure within the valve sets up a bending moment tending to open the valve body at the slot and to counteract this bending moment, the valve is provided with reinforcing ribs 67 and 68.

To provide wear surfaces for the valve disc, it is preferred that wear members 69 and 71 be provided with their confronting surfaces 72 and 73 extending parallel to each other and providing seat surfaces for cooperation with the valve member to control flow through the valve. These wear inserts are also provided with O-rings 74 and 75 to prevent fluid passing between the body and wear insert.

Means are provided to confine the wear inserts 69 and 71 and valve member 66 in a manner which will hold the wear inserts against rotation so that the ports 76 and 77 in these inserts will align with inlets 62 and 63, while permitting the valve disc to rotate. The slot 64 has a curved portion 64a which is entirely enclosed by the body and extends almost 180 degrees as best shown in Figs. 9 and 10. Each of the wear inserts is notched at 78. A pair of opposed studs 79 and a second pair of opposed studs 81 spaced from the first pair divide the open portion of slot 64 into approximately three equal segments with the studs maintaining the wear plates and valve member in place. The studs are provided with a journal portion 79a which fits into slot 78 to hold the wear members in place. The studs have a smaller diameter journal 79b at that end of each stud which overlies the valve member 66 and provides a cage for the valve member while permitting it to rotate about its own center. The ends of studs 79 are spaced apart a distance to permit movement of handle 82 therethrough to rotate the valve member.

Referring now to the valve member and its seal means it will be seen to conform generally to those used with the gate valve except that the shape of the areas defined by the two pairs of seal rings differ due to rotation of the valve instead of reciprocation. Again, a seal 83 controls flow through the valve member and is confined in a recess 84 in the valve member by a plate 85 which is provided with the undercut and grooved surfaces 86 and 87 which function in the same manner as explained in connection with the gate valve.

The area defined by seal means including the seal 83 is balanced by an area defined by seal means including seal 88 on the other side of the valve member in engagement with seat surface 72. This seal defines a horseshoe shaped balancing area on the valve member whose centroid is on a line perpendicular to the valve seat and passing through the centroid of the area defined by seal 83. Interconnecting passageways 89 between the areas defined by seals 83 and 88 expose these areas to the same pressure and balance the effect of this pressure on the valve member. Outer seals 91 and 92 surround the inner seals 88 and 83 respectively to define areas on the valve member exposed to pressure within passageway 63. Again these seals preferably surround the flow-way 65 through the valve member so that only one seal will pass over the passageways through the valve when moving the valve member between open and closed position. The seals are constructed in like manner to the seals of the gate valve. The two inner seal means 83 and 88 define equal areas in the planes of contact between the valve member and seat surfaces. The areas defined are equal regardless of which side of the valve is exposed to the higher pressure. Each pair of areas exposed to a common pressure are also arranged with their centroids on a line perpendicular to the seat surface so that not only is the pressure on the valve member balanced, but there is no turning moment on the valve due to the pressures. The area of the valve member outside of the outer seal rings provides equal and opposite effective pressure areas on the valve member.

Referring now to Figs. 12 through 14, there is shown a plug valve constructed in accordance with this invention.

The valve body 101 has in-line passageways 102 and 103 opening into a central transverse cylindrical bore 104 extending through the valve member. The passageways 102 and 103 are provided with suitable end fittings such as the threaded fitting shown for connecting the valve in a flow line.

To provide a wear member for the valve, a cylindrical wear insert 105 is inserted into the transverse bore 104 and seals are established about the passageways 102 and 103 between the body and the inserts. These seals may be provided by O-rings 108 and 109 as shown. Flowways 106 and 107 in the insert are in register with passageways 103 and 102 respectively.

The insert 105 is held in the valve body against both rotative and longitudinal movement by stud 111 which extends into a hole 112 in the outer periphery of insert 105.

A cylindrical plug valve member 113 is mounted for rotation in the insert. The upper end of the insert is provided with a slot 114 which extends circumferentially about the insert slightly more than 90 degrees. An operating handle 115 extends through slot 114 and is threadedly secured to the upper end of valve member 113. Handle 115 provides a means for rotating the valve member as well as holding it against longitudinal movement within the insert 105.

The valve member 113 is cylindrical in shape and its outer diameter is slightly smaller than the inner diameter of seat surface 116 of insert 105 to permit the free rotation of the valve member. The valve member has a flow-way 117 therethrough which when aligned with passageways 102 and 103 provides for flow through the valve.

A flowable seal member 118 is provided in the outer periphery of the valve member at a point spaced 90 degrees from the flow-way 117 and dimensioned and arranged to surround passageway 103 when the valve is closed to prevent flow through the valve. As in the case of the other two forms of valves, the seal 118 is positioned in a recess in the outer periphery of valve member 113. A plate 119 centered in the recess as by welding at 120 provides a groove for the flowable seal member 118. Again the plate has a peripheral undercut in its underside. As best shown in Fig. 14, the plate is rectangular in elevation and the side edges of plate 119 as viewed in Fig. 14 are formed on a radius of the valve member. Therefore, it is in effect undercut relative to passageway 103. Thus, the seal 118 is held against being pulled out of its groove by an undercut surface as in the other forms of the valve illustrated.

The pressure in passageway 103 and against the area defined by the seal means including seal 118 is balanced by seal means on the other side of the valve. Inasmuch as the seat surface is annular, the balancing area need not be the same as the area defined by seal means 118 so long as it provides an equal and opposite effective pressure area. Its size will depend upon its location on the valve member. In the instant form of valve, the balancing area is provided by seal means including a pair of flowable seal members 122 and 123 which define areas spaced above and below the passageways 103 and 102 so that these seals will not pass over an opening in the insert as the valve is moved between open and closed position. This feature reduces wear of these seals. In the form illustrated, the areas defined by seals 122 and 123 are located directly opposite the seal area exposed to the passageway 103. However, it will be appreciated that the seal areas could be arranged about the valve member in any desired form and in any desired number of individual areas so long as the force on the valve member provided by pressure acting on these areas resulted in an equal and opposite force to that exerted on the area defined by seal 118. Passageways 124 and 125 interconnect the area defined by seal 118 with the areas defined by seals 123 and 122 respectively to supply the balancing areas with pressure fluid from passageway 103.

Upper and lower seals 126 and 127, positioned on opposite sides of seals 118, 122, and 123, seal between the plug and insert at the upper and lower ends of the plug respectively. These seals are in a plane perpendicular to the rotational axis of the plug and confine pressure from passageway 102 which it will be noted is exerted on the plug about its entire area except those areas defined by the three inner seal rings 118, 122 and 123. As these three areas are arranged so that the net effect of an equal pressure thereon is zero, the pressure from passageway 102 on the remainder of the valve member will also be zero.

Again the area of the seal means provided by seal 118, in this case the area of the opening from the groove, is equal to the combined areas of the seal means provided by seals 122 and 123 in the plane of contact between the valve member and valve seat. The areas of these seal means shift in accordance with the side of the valve which is the high pressure side as heretofore explained.

The flow-way 117 through the valve member is provided with seal 128 which surrounds the flow-way and the passageway 103 when the valve is open to prevent flow of the controlled fluid about the outer periphery of the plug when the valve is open. This seal is always exposed on both its sides to the same pressure and, therefore, does not affect the balance of the valve.

While the above discussion has been primarily directed to the condition of the several forms of valves when closed, it will be appreciated that each form is fully balanced when open. The pressure trapped within the inner seals will be equal and these areas will be in balance. Line pressure will be effective over equal and opposite effective pressure areas on the remainder of the valve member within the outer seals and these areas will be in balance.

Referring now to Figs. 15 through 17, this invention is shown embodied in a two ram blowout preventer, which is in reality a gate valve having two gates movable toward each other to close the valve. Blowout preventers are used in the drilling of petroleum wells for lubricating tools into and out of the well under pressure and for closing off the well at the surface when the well pressure gets out of control. Frequently two and sometimes three or four blowout preventers are employed in tandem. One preventer will have the front or opposed surfaces of its valve members, generally referred to as rams, extending in flat planes or otherwise of complementary shape so that as two opposed rams come together they will abut across the ram front and a seal will be formed therebetween by the ram front packing. Other blowout preventers on the same well will employ rams having semi-cylindrical depressions in the ram fronts which will embrace a pipe within the blowout preventer when the preventer is closed to seal the annulus between the pipe and preventer bore. The blowout preventer illustrated is of the type for sealing an open bore and the rams thereof are commonly referred to as blanking or blind rams.

The body of the blowout preventer, indicated generally at 148, has a central bore, indicated generally at 149, provided by passageways 150 and 151. In use the axis of this bore is vertical. Upper and lower flanges 152 and 153 respectively are provided for flanging the blowout preventer to the wellhead. Well tools such as drill pipe are passed through the bore 149, which during normal drilling operations is open.

Opposed identical ram chambers 154 and 155 extend laterally from bore 149 and provide, with bore 149, seat surfaces for the identical rams indicated generally at 156. Rams 156 are mounted for reciprocation in the chambers toward and away from bore 149.

The rear ends of the chambers 154 and 155 may be opened to permit insertion and removal of the rams. The rear ends of the chambers are closed when in use by identical bonnets indicated generally at 157. Bonnets 157 are provided with yokes 158 in which crossheads 159 reciprocate toward and away from the preventer bore. The crossheads are reciprocated by a power means, preferably hydraulic, which has been omitted to simplify the drawings. The crosshead 159 carries a rod 161 which is connected to the rear of the ram 156 and reciprocates the ram with reciprocation of the crosshead.

For purposes which will appear below the bonnet 157 is provided with a boss 162 which projects into the rear end of the chamber. The connecting rod 161 passes through a bore 163 in the boss and a gland type packing indicated generally at 164 provides a sliding seal between the boss and rod.

The ram 156 is provided with an internal bore 165 in its rear end which is slidably received about boss 162. The connecting rod 161 is secured to the ram at the bottom of bore 165 by a conventional T-slot connection indicated generally at 166.

In order to balance each ram, seal means are provided on the ram which define balancing areas on the ram and means are provided for conducting pressure to these areas. The pressure in passageway 150 will first be considered and it will be assumed that the ram is closed and the pressure in passageway 150 is greater than the pressure in passageway 151. This will be the case when the preventer is closed as the underside of the preventer is exposed to well pressure and the upper side of the preventer is exposed to atmospheric or some intermediate pressure.

The seal means includes ram front packing 167. When the rams are closed the ram front packing of the two rams is in abutment and seals between the rams. The seal means continues back from the ram front packing into the chamber and down under the ram at 168, and over to the ram front packing 167 on the other side of the ram to form a continuous seal with the bore and chamber. The pressure in passageway 150 will be acting on the downwardly facing exposed area 169 of the ram, defined by seals 167 and 168. This pressure will tend to force the front of the ram upwardly and thereby create a side or vertical upward thrust on the ram. In order to balance this side or upward thrust an upper balancing area 170 on the upper half of the ram is defined by side seals 171 and 172, front upper seal 173, and upper intermediate seal 174. If the area 170 is effectively equal in a direction vertically downward and hence opposing, although horizontally offset from the area 169, and no other forces were exerted on the ram, there would be an unbalanced turning moment exerted on the ram due to the horizontally offset relation of the areas 169 and 170. This would tend to rotate the ram about a horizontal axis normal to the direction in which the ram moves between closed and open positions. Therefore, an additional lower balancing area 175 is provided on the rear lower half of the ram to counterbalance a part of the turning moment. If a complete balance between upward and downward forces due to pressure on the ram is to be achieved by pressure on the three areas 169, 170, and 175, the upper balancing area 170 must oppose and balance in value the effective pressure areas in a vertical direction of both the lower balancing area 175 and exposed area 169. Thus the ram has effectively equal pressure areas disposed on its upper and lower sides. This lower balancing area 175 is spaced horizontally from both areas 169 and 170 in a direction opposite from the axis of the bore 149 and provides a moment opposed to that provided by pressure on the areas 169 and 170. The effective lower balancing area 175 is provided by lower rear seal 176 and the side seals 171 and 172. The effective pressure area of the upper balancing area 170 is equal and oppositely directed to the exposed area 169 and lower balancing area 175 combined and is positioned intermediate and offset horizontally from both of said areas 169 and 175. While it is possible to design these three areas to balance both the vertical force on the ram and the turning moment generated by pressure on the ram, the resulting ram would have to be rather long in order to provide the required extent of areas 170 and 175. To shorten the ram as much as possible it is preferred to dimension and arrange the areas 169, 170 and 175 to balance the up and down or vertical forces on the ram, but leave the resulting moments in a state of unbalance. This unbalanced turning moment is balanced in balancing the effect of pressure on the front of the ram. Thus, in the illustrated preventer each ram though having equal and oppositely directed total effective areas on opposed sides of the ram exposed to pressure in passageway 150 is subject because of the mutually offset positions of said areas to a resultant moment of force tending to turn the front of the ram upward.

Pressure from passageway 150 may be conducted to the balancing areas 170 and 175 in any convenient manner such as by conduit 178 extending between areas 169 and 170 and branch conduit 179 extending from conduit 178 to the rear of the ram.

Pressure in passageway 150 is also effective on the ram front over substantially the entire area of ram front packing 167 and the area 180 of the ram front therebelow. This pressure tends to open the rams. To provide a fully balanced blowout preventer, it is preferred that this pressure be balanced. For this purpose a balancing area is defined on the rear of the ram and this area and the area of the ram front subject to pressure in passageway 150 provide equal and opposite effective pressure areas. This rear balancing area is provided by the annular end face 181 of the ram which is between the side wall of the ram chamber and boss 162. An annular sliding seal 182 seals between the boss and bore 165 in the rear of the ram. The pressure fluid on the rear of the ram is contained by seals 180, 171, 172 and 176. Pressure fluid from passageway 150 is conducted to rear balancing area 181 through conduit 178 and branch conduit 179.

It will be recalled that in balancing the side thrust on the ram there remained a moment of force tending to rotate the front of the ram upwardly. The pressure from passageway 150 on the ram front provides a counter turning moment. In the design illustrated, however, this counter moment is not sufficient to completely balance the turning moment about the ram. Therefore, the boss 162 and bore 165 at the rear of the ram are displaced downwardly of the ram chamber from its central axis to provide a larger annular area between the boss and side wall of the chamber on the upper half of the ram than on the lower half of the ram. Thus, the balancing area on the rear of the ram is arranged to provide an additional counter moment which is additive to the turning moment generated by the pressure on the ram front. These two counter moments completely balance the turning moments on the ram.

The seal means of each ram is preferably provided by an interference type seal which is, of course, flowable. As this type of seal material forms a seal substantially at the low pressure side of the material, each of the high pressure areas discussed above includes substantially all of the seal material which defined the areas.

While high pressure will always be in passageway 150 on the lower side of the blowout preventer, it is possible that leakage past the ram front packing could cause pressure to build up on the low pressure side of the seals heretofore referred to. If this happened, the areas subject to pressure in passageway 150 might be varied. Furthermore, in some instances such as in lubricating a tool through the wellhead pressure may build up in passageway 151 and it is desired to have this pressure on the rams balanced so that it will not affect opening and closing of the rams. For this reason the remaining areas of the rams and the passageway 151 are interconnected by a conduit means and provide areas for balancing the effect of pressure in passageway 151 on the rams.

The ram front packing 167 and the upper front seal 173 function in substantially the same manner as the ram front packing and lower front seal 168 to seal between the ram and bore. Thus, the pressure in passageway 151 exerts a downward force on area 183 on the upper section of the ram defined by ram front packing 167 and seal 173. To balance this pressure upper and lower balancing areas similar to those described above are provided. Pressure fluid from passageway 151 is conducted through a suitable conduit such as conduit 184 to the bore 165 in the center of the ram and thence through a conduit 185 from the bore to the lower balancing area 186 on the bottom of the ram defined by the lower front seal 168, the lower rear seal 176, and the two side seals 171 and 172. Pressure from bore 165 is conducted through a lateral conduit 187 to an area 188 on the upper rear end of the ram defined by the upper rear seal 180 and intermediate seal 174 together with the two side seals 171 and 172. Balancing area 186 and the combined exposed area 183 and balancing area 188 provide equal and oppositely directed effective pressure areas.

As in the case of balance of the side thrust resulting from pressure in passageway 150, the balance of side thrust from pressure in passageway 151 in the manner illustrated leaves an unbalanced moment on the ram which tends to rotate the front of the ram downwardly. It is preferred to balance this moment of force in balancing the pressure on the upper front of the ram.

The area 189 of the ram front above the ram front packing 167 is subject to pressure in passageway 151. This area and the area of the bottom of bore 165 provide equal and oppositely directed effective pressure areas. They are subject to the same pressure through conduit 184. As a loose connection is provided between the ram and rod 161, this pressure will be effective over an area equal to the diameter of bore 165. Pressure on ram front area 189 provides a counter moment of force to the turning moment on the ram resulting from balance of exposed area 183. In the design illustrated, however, this counter moment is not sufficient to balance the turning moment on the ram. It will be recalled that bore 165 is displaced downwardly from the center line of the ram chamber. Therefore, the pressure acting on the bottom of the bore 165 exerts a counter moment which is additive to the counter moment resulting from pressure on area 189. These two counter moments completely balance the turning moment resulting from balancing the side thrust on the ram. Thus, the ram is entirely balanced for different pressures in passageways 150 and 151. When pressures on opposite sides of the preventer are equal or when the blowout preventer is open, the pressure in passageways 150 and 151 is identical and the entire ram is subject to the same pressure. It is, therefore, in balance.

When the rams are closed the holddown bolts 190 may be screwed into the yoke 158 to abut against the crosshead 159 and hold the rams in closed position. This permits the closing force to be removed from the ram actuator if desired.

From the above it will be seen that all of the objects of this invention have been attained. There has been provided a means for balancing any type of valve which is subject to a side thrust. The valve may be constructed so as to be completely balanced regardless of which side of the valve is exposed to the higher pressure. The construction preferred employs seal means which give a sharp line of division of pressure. A valve has been provided in which the balancing areas change in size as the pressure differential shifts across the valve and yet the valve remains completely balanced. This permits the use of the preferred flowable seals such as interference type seals.

The balancing areas on the valves are so arranged that only a single seal need be passed across an opening in moving the valve member between open and closed position. In the blowout preventer embodiment no seal need be passed across an opening in opening and closing a ram.

The construction is such that the valve member is balanced not only against side thrust but in every direction. In other words, for every area on the valve member there is an area providing an equal and opposite pressure responsive area and the moments of force of such areas are in balance.

In the blowout preventer form of this invention illustrated, vertical and horizontal forces induced by pressure balance completely, and the moments induced by these forces add up to zero in all cases.

The above discussion of the novel illustrated embodiments of this invention has been directed to a completely balanced gate valve, blowout preventer, etc. However, it will be appreciated that the invention can be employed to obtain controlled amounts of unbalance. For instance, it may be desirable to design the areas on the blowout preventer rams to provide an unbalanced force tending to maintain the rams in closed position.

From the foregoing it will be seen that this invention is one well adapted to attain all of the ends and objects herein above set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve comprising, a valve body having first and second passageways opening into a valve seat, said seat having seat surfaces extending transversely of both passageways, valve means movably mounted in the valve seat for controlling flow through the passageways, and seal means between the body and valve means providing on the valve means balancing areas, passage means interconnecting the balancing areas and the passageways, whereby said balancing areas are exposed to the pressures in the first and second passageways respectively when the valve is closed, said seal means also providing equal effective pressure areas on the opposite surfaces of the valve means which extend between the seat surfaces, said last-mentioned areas exposed to equal pressures at all times.

2. A valve comprising, a valve body having first and second passageways opening into a valve seat, said seat having seat surfaces extending transversely of both passageways, valve means movably mounted in the valve seat for controlling flow through the passageways, seal means between the valve means and seat defining equal effective pressure areas on opposite sides of the valve means, passage means interconnecting the equal effective pressure areas and first passageway, whereby said equal effective pressure areas are exposed to pressure in the first passageway, said seal means also defining equal effective pressure areas on opposite sides of the valve means, additional passage means interconnecting the last mentioned equal effective pressure areas and second passageway, whereby said last mentioned equal effective areas are exposed to pressure in the second passageway when the valve is closed, said seal means also defining equal effective pressure areas on opposite sides of the valve means which extend transverse to the seat surfaces, said last-mentioned areas exposed to equal pressures, all of said areas disposed about the valve means in such fashion that the moments of force on the valve means are balanced at all times.

3. A valve comprising, a valve body having first and second passageways opening into a valve seat, said seat having seat surfaces extending transversely of both passageways, valve means movably mounted in the valve seat for controlling flow through the passageways, seal means between the valve means and seat defining equal areas on opposite sides of the valve means, passage means interconnecting the equal areas and first passageway, whereby said equal areas are exposed to pressure in the first passageway, said seal means also defining equal areas on opposite sides of the valve means, additional passage means interconnecting the last mentioned equal areas and the second passageway, whereby said last mentioned equal areas are exposed to pressure in the second passageway when the valve is closed, said seal means also defining equal areas on opposite sides of the valve means which extend transverse to the seat surfaces, said last-mentioned areas exposed to equal pressures, all of said areas disposed about the valve means in such fashion that the moments of force on the valve means are balanced at all times.

4. A blowout preventer comprising, a body having first and second passageways providing a bore therethrough, ram chambers extending laterally from said bore, rams slidably mounted in the chambers and movable therein to and from closed positions separating said passageways so as to control flow through the passageways, and seal means between the rams and body providing balancing areas on the rams, passage means interconnecting the balancing areas and one of said passageways, whereby the balancing areas are exposed to said one passageway when the rams are in closed positions and balancing the effect of pressure in said one passageway on the rams.

5. A blowout preventer comprising, a body having first and second passageways providing a bore therethrough, ram chambers extending laterally from said bore, rams slidably counted in the chambers and movable therein to and from closed positions separating said passageways so as to control flow through the passageways, and seal means between the rams and body providing balancing areas on the rams, passage means interconnecting the balancing areas and passageways, whereby the balancing areas are exposed to the first and second passageways respectively when the rams are in closed positions and balancing the effect of pressures in the passageways on the rams.

6. A blowout preventer comprising, a body having first and second passageways providing a bore therethrough, ram chambers extending laterally from said bore, rams slidably mounted in the ram chambers for controlling flow through the passageways, and seal means between the rams and body defining equal effective pressure areas on opposite sides of the rams, passage means interconnecting the equal effective pressure areas and first passageway, whereby said effective pressure areas are exposed to pressure in the first passageway said seal means also defining equal effective pressure areas on opposite sides of the rams additional passage means interconnecting the last mentioned equal effective pressure areas and second passageway, whereby said last mentioned equal effective pressure areas are exposed to pressure in the second passageway, said seal means also defining equal effective pressure areas on the front and rear faces of the rams which are exposed to equal pressures, said areas disposed about the rams in such fashion that the moments of force on the rams are balanced.

7. A blowout preventer comprising, a body having first and second passageways providing a bore therethrough, a ram chamber extending laterally from said bore, a ram slidably mounted in the ram chamber for controlling flow through the passageways, and seal means between the ram and body defining equal effective pressure areas on the first and second passageway sides of the ram and on the front and rear of the ram, means interconnecting said areas and said first passageway, said seal means defining additional equal effective pressure areas on the first and second passageway sides of the ram and on the front and rear of the ram, means interconnecting said additional areas and the second passageway, said areas disposed about the ram in such fashion that the moments of force on the ram are balanced.

8. A blowout preventer comprising, a body having first and second passageways providing a bore therethrough, a ram chamber extending laterally from said bore, a ram slidably mounted in the ram chamber for controlling flow through the passageways, seal means between the ram and body defining spaced areas on the first passageway side of the ram and an intermediate area on the second passageway side of the ram providing an effective pressure area equal to said spaced areas, said seal means also defining equal effective pressure areas on the front and rear of the ram when the preventer is closed, means interconnecting said areas and the first passageway to expose said areas to the first passageway pressure, said areas disposed about the ram in such fashion that all moments of force about the ram are balanced.

9. A blowout preventer comprising, a body having first and second passageways providing a bore therethrough, ram chambers extending laterally from said bore, rams slidably mounted in the ram chambers for controlling flow through the passageways, seal means between each ram and the body defining spaced areas on the first passageway side of each ram and an area intermediate thereof on the second passageway side of each ram providing an effective pressure area equal to said spaced areas, said seal means also defining equal effective pressure areas on the front and rear of each ram, means interconnecting said areas and the first passageway to expose said areas to the first passageway pressure, said seal means defining additional spaced areas on the second passageway side of each ram and an additional area intermediate said first-mentioned spaced areas on the first passageway side of each ram providing an effective pressure area equal to said additional spaced areas, said seal means also defining additional equal effective pressure areas on the front and rear of each ram, means interconnecting the second passageway with said additional areas, all of said areas disposed about the ram in such fashion that all moments of force about the rams are balanced.

10. A blowout preventer comprising, a body having first and second passageways providing a bore therethrough, a ram chamber extending laterally from the bore, a ram slidably mounted in the chamber for controlling flow through the passageways, one of said ram and body having a boss and other having a bore slidably receiving the boss at the rear of the ram, said boss and bore being positioned off-center of the ram chamber toward the first passageway, plural seal means between the ram and body defining spaced areas on the first passageway side of the ram and an area intermediate thereof on the second passageway side of the ram providing an effective pressure area equal to the effective pressure area of said spaced areas, said seal means sealing between the ram and boss and defining an effective pressure area on the front of the ram equal to the area of the annulus between the side wall of the chamber and the seal between the ram and boss, and means interconnecting the first passageway and said areas, said areas disposed about the ram in such fashion that all moments of force about the ram are balanced.

11. The blowout preventer of claim 10 wherein the seal means additionally provides an effective pressure area on the front of the ram equal and opposite to the effective pressure area of the bore in the rear of the ram, said seal means additionally providing spaced areas on the second passageway side of the ram and an equal effective pressure area intermediate thereof on the first passageway side of the ram, and conduit means interconnecting said second passageway and all of said additional areas and the bore in the rear of the ram, said additional areas and bore disposed about the ram in such fashion that all moments of force about the ram are balanced.

12. A ram for a blowout preventer comprising, a ram body having front and rear ends and top and bottom sides, seal means including packing on the front of the ram body, said seal means having portions extending over and defining spaced areas on front and rear portions of the bottom side of the ram body and an area equal thereto on the top side of the ram body and intermediate said spaced areas, and said body having passageways interconnecting all of said areas.

13. A ram for a blowout preventer comprising, a ram body having front and rear ends and top and bottom sides, seal means including packing on the front of the ram body, the ram body having a bore in the rear end thereof and offset from the center line of the body toward the bottom side of the ram body, the area of the rear end of the ram body outside said bore being equal to the area on the front end of the ram body below and including the packing on the front end of the ram body, said seal means having portions extending over and defining spaced areas on the bottom side of the ram body and an area equal thereto on the top side of the ram body and intermediate said spaced areas, and said body having passageways interconnecting all of said areas.

14. A ram for a blowout preventer comprising, a ram body having front and rear ends and top and bottom sides, seal means including packing on the front of the ram body, the ram body having a bore in the rear end thereof and offset from the center line of the body toward the bottom side of the ram body, the area of the rear end of the ram body outside said bore being equal to the area on the front end of the ram body below and including the packing on the front end of the ram body, said seal means defining spaced areas on the bottom side of the ram body and an area equal thereto on the top side of the ram body and intermediate said spaced areas, said body having passageways interconnecting all of said areas, the effective area of said bore being equal to the area of the front end of the ram body above the packing on the front end of the ram body, said seal means additionally having portions extending over and defining spaced areas on the top side of the ram body and an additional area equal thereto on the bottom side of the ram body and intermediate said last mentioned spaced areas, and said body having passageways interconnecting said additional areas and the bore in the rear end of the body and the front end of the ram body above the packing on the front end of the ram body.

15. A valve comprising, a valve body having first and second passageways opening into a valve seat, valve means movably mounted in the valve seat for controlling flow through the passageways, seal means between the body and valve means providing on the valve means balancing areas, passage means interconnecting the balancing areas and passageways, whereby said balancing areas are exposed to the pressures in the first and second passageways respectively when the valve is closed, at least a portion of said seal means defining each area being common to areas exposed to pressure in different passageways, said portion of the seal means providing a part of the areas exposed to the passageway subject to the highest pressure and shifting between areas with shifts in pressure differential across the valve, said portions of the seal means adding and subtracting equal effective pressure areas to and from the areas exposed to each passageway with shifts in pressure differential across the valve.

16. A valve comprising, a body having first and second passageways providing a bore therethrough, a ram valve chamber extending laterally from said bore, a ram valve member slidably mounted in the chamber for controlling flow through the passageways, seal means between the ram valve member and body providing on the rear of the ram valve member an equal effective pressure area to the area of the ram front exposed to pressure in said one passageway in all positions of the ram, and conduit means interconnecting said areas.

17. A blowout preventer comprising, a body having first and second passageways providing a bore therethrough, a ram chamber extending laterally from said bore, a ram slidably mounted in the chamber for controlling flow through the passageways, seal means between the ram and body providing on the rear of the ram an equal effective pressure area to the area of the ram front exposed to pressure on one side of the blowout preventer when closed and an equal effective pressure area to the area of the ram front exposed to pressure on the other side of the blowout preventer when closed, and separate conduit means interconnecting each group of equal effective pressure areas.

18. A blowout preventer comprising, a body having first and second passageways providing a bore therethrough, a ram chamber extending laterally from said bore, a ram slidably mounted in the ram chamber for controlling flow through the passageways, and seal means between the ram and body defining equal effective pressure areas on opposite sides of the ram exposed to pressure in the one passageway, said areas resulting in an unbalancing turning moment on the ram, said seal means also defining equal effective pressure areas on the front and rear faces of the ram exposed to pressure in the one passageway, said last-mentioned equal areas providing an unbalanced counter moment equal and opposite to the turning moment resulting from said first-mentioned equal areas, and passage means interconnecting the equal effective pressure areas and said one passageway.

19. A blowout preventer comprising, a body having first and second passageways providing a bore therethrough, ram chambers extending laterally from said bore, rams slidably mounted in the ram chambers for controlling flow through the passageways, and seal means between the rams and body defining equal effective pressure areas on opposite sides of the rams, passage means interconnecting the equal effective pressure areas and one passageway, whereby said equal effective pressure areas are exposed to pressure in the one passageway, said seal means also defining equal effective pressure areas on opposite sides of the rams, additional passage means interconnecting the last mentioned equal effective pressure areas and second passageway, whereby said equal effective pressure areas are exposed to pressure in the second passageway, said seal means also defining equal effective pressure areas on the front and rear faces of the rams which are exposed to equal pressures, said areas disposed about the rams in such fashion that the moments of force on the rams are balanced, substantially the entire outer surface of each ram either blocking flow through the preventer when the ram is closed or providing a balancing area.

20. A blowout preventer comprising, a body having first and second passageways providing a bore therethrough, a ram chamber extending laterally from said bore, a ram having front and rear ends slidably mounted in the chamber for sliding movement toward and from a position with a portion adjacent its front end obstructing communication between said passageways, seal means between the body and ram providing on the rear end of the ram first and second pressure responsive areas, other seal means between the ram and body and extending across the front end of said ram and providing on said front end pressure responsive areas effectively equal to said first and second areas, respectively, and separate conduit means providing fluid communication between the first passageway and said first area and between the second passageway and said second area.

21. A valve according to claim 1 further characterized in that said valve means comprises a valve member mounted for sliding engagement with the seat surfaces for controlling flow through the passageways, said seal means being situated between the valve member and body and including first seal means surrounding a flow passageway opening into one seat surface when the valve is closed to prevent flow through the valve, and second seal means between the valve member and other seat surface defining a balancing area, said first and second seal means defining equal effective pressure areas on opposite surfaces of the valve member, and said passage means includes a conduit for conducting pressure fluid between these areas, said first mentioned seal means also defining equal effective pressure areas on opposite surfaces of the remainder of the valve member, corresponding ones of the opposed areas being exposed to equal pressures.

22. A valve according to claim 1 further characterized in that said valve means comprises a valve member mounted for sliding engagement with the seat surfaces for controlling flow through the passageways, said seal means being situated between the valve member and body and including first seal means surrounding a flow passageway opening into one seat surface when the valve is closed to prevent flow through the valve, and second seal means between the valve member and other seat surface defining a balancing area, said first and second seal means defining equal effective pressure areas on opposite surfaces of the valve member, and said passage means includes a conduit for conducting pressure fluid between these areas, said first and second seal means being exposed to pressure in both flow passageways when the valve is closed, said first mentioned seal means also defining equal effective pressure areas on opposite surfaces of the remainder of the valve member.

23. A valve according to claim 22 wherein the seat surfaces are arranged in parallel planes and said seal means includes a pair of seal rings between the valve member and each seat surface, one seal ring of each pair surrounding a flow passageway opening into a seat surface in both open and closed position of the valve member, and only one of said seal rings passing over a flow passageway opening in a seat surface as the valve is moved between open and closed position.

24. A valve according to claim 1 further characterized in that said seat surfaces comprise opposed first and second parallel plane seat surfaces, said first and second passageways opening into said first and second seat surfaces, respectively, said valve means comprises a valve member having a flow passageway therethrough and parallel surfaces in sliding engagement with said seat surfaces controlling flow through the valve, said seal means includes first and second pairs of seal rings between the valve member and the first and second surfaces, respectively, said seal rings of each pair arranged with an outer ring surrounding an inner ring, the inner of said first pair of seal rings surrounding the first passageway opening when the valve is closed to block flow through the valve, said second pair of seal rings surrounding both the second passageway opening and the flow-way through the valve member in both open and closed position, said second seal rings defining an area therebetween equal to the area defined by the inner ring of said first pair, and said passage means includes conduit means interconnecting said areas to expose them to pressure within the first passageway when the valve is closed to balance the effect of such pressure on the valve member, the area between the inner and outer first pair of seal members being equal to the area interiorly of the inner seal member of the second pair, said last mentioned areas interconnected by the flow-way through the valve member to expose them to pressure within the second passageway when the valve member is closed to balance the effect of such pressure on the valve member.

25. The valve of claim 24 wherein the seal rings are provided by O-rings.

26. A valve according to claim 1 further characterized in that said seat surfaces comprise parallel flat seat surfaces, said valve means comprises an annular valve member mounted for rotation about a fixed axis and cooperable with the seat to control flow through the valve, said valve member having a passageway therethrough which aligns with the passageways in the body when the valve is open, said seal means includes seal rings between the valve member and each seat surface, one of said seal rings surrounding one of the flow passageways opening into the seat when the valve is closed to prevent flow through the valve, other of said seal rings between the valve member and other seat surface defining a balancing area equal to the area defined by said one seal ring, both of said areas having their centroid on a line extending parallel to the axis of rotation of the valve member, and said passage means includes a conduit for conducting pressure fluid between these areas, said seal means also defining equal balancing areas on opposite surfaces of the remainder of the valve member, corresponding ones of the opposed balancing areas being exposed to like pressures.

27. A valve according to claim 1 further characterized in that said valve seat is cylindrical, said valve means comprises a cylindrical valve member having a flow-way therethrough and mounted for rotation in the seat for controlling flow through the valve, said seal means being situated between the valve member and seat and including first seal means surrounding said first passageway and defining an area on the valve member exposed to pressure in the first passageway when the valve is closed to prevent flow through the valve and second seal means defining another area on the valve member which is sized and arranged to balance the force on the valve member due to pressure in the area defined by said first seal means when both areas are subjected to like pressure, and said passage means includes conduit means for conducting pressure fluid from said first passageway to said another area, said first mentioned seal means also defining equal balancing areas on opposite surfaces of the remainder of the valve member, corresponding ones of the opposed balancing areas being exposed to equal pressures.

28. A valve according to claim 27 wherein said first mentioned seal means also includes seal rings extending around the valve member above and below said first and second seal means confining pressure fluid in said second flow passageway, and together with said first and second seal means defining an area whose centroid lies on the rotational axis of the valve member.

29. A valve according to claim 1 further characterized in that said seal means includes first and second seal means having flowable seals and sealing between the valve seat and valve means, said first seal means surrounding the said first passageway when the valve is closed to prevent flow through the valve and defining a first area on the valve means exposed to said first passageway, said second seal means defining a second area on the valve means which is sized and arranged to balance the force on the valve means due to pressure on the first area when both areas are subjected to like pressures, said first seal means and at least a portion of the second seal means exposed to pressure in the second pasageway, the area of said first seal means and said portion of the second seal means in the plane of contact between the seat and valve means providing equal effective pressure areas, and said passage means includes conduit means for conducting pressure fluid from said first passageway to said second area.

30. A valve according to claim 1 further characterized in that said valve means comprises a valve member having a flow-way therethrough, said seal means has flowable seals and includes first and second seal means sealing between the valve seat and valve member, said first seal means surrounding said first passageway when the valve is closed to prevent flow through the valve and defining a first area on the valve member exposed to said first passageway, said second seal means defining a second area on the valve member which is sized and arranged to balance the force on the valve member due to pressure on the first area when both areas are subjected to like pressures, said first seal means and at least a portion of the second seal means exposed to pressure in the second passageway, the area of said first seal means and said portion of the second seal means in the plane of contact between the seat and valve member providing equal effective pressure areas, said passage means including conduit means for conducting pressure fluid from said first passageway to said second area, and said first mentioned seal means also defining equal effective pressure areas on opposite surfaces of the valve member exposed to pressure in the second passageway to balance the effect of such pressure.

31. A valve according to claim 1 further characterized in that said valve means comprises a valve member having a flow-away therethrough, said seal means has flowable seals and includes first and second seal means sealing between the valve seat and valve member, said first seal means surrounding said first passageway when the valve is closed to prevent flow through the valve and defining a first area on the valve member exposed to said first passageway, said second seal means defining a second area on the valve member which is sized and arranged to balance the force on the valve member due to pressure on the first area when both areas are subjected to like pressures, said first seal means and at least a portion of the second seal means exposed to pressure in the second passageway, the area of said first seal means and said portion of the second seal means in the plane of contact between the seat and valve member providing equal effective pressure areas, said passage means includes a passageway for conducting pressure fluid from said first passageway to said second area, said seal means also defining equal effective pressure areas on opposite surfaces of the valve member exposed to pressure in the second passageway to balance the effect of such pressure, said seal means further defining equal effective pressure areas on the remainder of the valve member exposed to the same pressure.

32. A valve according to claim 31 wherein all of the seals of the seal means are provided by interference type seals.

33. A valve according to claim 1 further characterized in that said seat is cylindrical, said valve means comprises a cylindrical valve member rotatedly mounted in the seat for controlling flow through the passageways, said cylindrical valve member having a flow-way therethrough, said seal means includes first, second and third seal means, said first seal means having a flowable seal carried by the valve member and surrounding the first passageway opening in the seat when the valve is closed, said second seal means having a flowable seal carried by the valve member on its side opposite the first seal means and defining a balancing area spaced from the second passageway when the valve is closed, said first and second seal means defining equal effective pressure areas on opposite surfaces of the valve member, said passage means includes a conduit for conducting pressure fluid between said areas, the area of the first and second seal means in the plane of contact between the valve member and seat providing equal effective pressure areas, and said third seal means is interposed between the body and valve member on opposite sides of said first and second seal means confining pressure fluid in said second passageway and defining equal effective pressure areas on opposite surfaces of the valve member.

34. A valve according to claim 33 wherein all of the seal means includes interference type seals.

35. A valve according to claim 33 wherein seal means is carried by the valve member and surrounds the flow-way through the valve member.

36. A valve according to claim 33 wherein the third seal means defines equal effective pressure areas on opposite surfaces of the remainder of the valve exposed to like pressures.

37. A valve according to claim 1 further characterized in that said seat surfaces comprise parallel flat seat surfaces, said valve means comprises an annular valve member mounted for rotation about a fixed axis and cooperable with the seat to control flow through the valve, said annular valve member having a passageway therethrough which aligns with the passageways in the body when the valve is open, said seal means has flowable seals and includes a pair of seal means between the valve member and each seat surface, said seal means arranged with an outer seal means surrounding an inner seal means, the inner seal means of one pair surrounding the passageway through the valve body when the valve is closed to block flow through the valve, the inner seal means of the other pair defining an area equal to the area defined by the inner seal means of the one pair, said areas arranged to have their centroids on a line parallel to the rotational axis of the valve member, said two inner seal means having equal areas in the plane of contact between the valve member and seat surfaces, said passage means includes a passageway interconnecting the two areas defined by the inner seal means to expose them to the same pressure, the area between the inner and outer seal means of each pair being equal and exposed to pressure in a passageway opening into said other seal surface when the valve is closed with pressure conducted across the valve member by the flow-away therethrough, said last two mentioned areas having their centroids in a line extending parallel to the rotational axis of the valve member.

38. A valve according to claim 37 wherein the seals of each seal means are provided by interference type seals.

39. A valve according to claim 1 further characterized in that said seat surfaces comprise opposed first and second parallel plane seat surfaces, said first and second passageways open into said first and second seat surfaces, respectively, said valve means comprises a valve member having a flow-away therethrough and parallel surfaces in sliding engagement with said seat surfaces for controlling flow through the valve, said seal means includes first and second pairs of seal means between the valve member and the first and second seat surfaces, respectively, said seal means of each pair arranged with an outer seal means surrounding an inner seal means, the inner of said first pair of seal means surrounding the first passageway opening when the valve is closed to block the flow through the valve, said second pair of seal means surrounding both the second passageway opening and the flow-way through the valve member in both open and closed position, said second pair of seal means defining an area therebetween equal to the area defined by the inner seal means of said first pair, said passage means includes conduit means interconnecting said areas to expose them to pressure within the first passageway when the valve is closed to balance the effect of said pressure on the valve member, the area between the inner and outer first pair of seal means being equal to the area interiorly of the inner seal means of the second pair, said last mentioned areas being interconnected by the flow-way through the valve member to expose them to pressure within the second passageway when the valve member is closed to balance the effect of such pressure on the valve member, the inner seal means of said pairs of seal means having equal areas in the planes of contact between the seat surfaces and valve member.

40. A valve according to claim 39 wherein the seals of the seal means are provided by interference type seals.

References Cited in the file of this patent

UNITED STATES PATENTS

| | | |
|---|---|---|
| 1,657,841 | Peris | Jan. 31, 1928 |
| 2,318,882 | Nevill | May 11, 1943 |
| 2,331,557 | Lorehn et al. | Oct. 12, 1943 |

FOREIGN PATENTS

| | | |
|---|---|---|
| 45,781 | Austria | Jan. 10, 1911 |
| 416,917 | Great Britain | of 1932 |
| 534,610 | Great Britain | Mar. 12, 1941 |
| 1,108,435 | France | of 1955 |